United States Patent
Forsee, II (10) Patent No.: US 8,812,429 B2
(45) Date of Patent: Aug. 19, 2014

(54) DECISION TREE CREATION AND EXECUTION IN AN INTERACTIVE VOICE RESPONSE SYSTEM

(75) Inventor: Daniel Forsee, II, Dover, DE (US)

(73) Assignee: Bank of America Corporation, Charlotte, NC (US)

(*) Notice: Subject to any disclaimer, the term of this patent is extended or adjusted under 35 U.S.C. 154(b) by 277 days.

(21) Appl. No.: 13/368,438

(22) Filed: Feb. 8, 2012

(65) Prior Publication Data

US 2013/0204834 A1 Aug. 8, 2013

(51) Int. Cl.
*G06N 5/00* (2006.01)
*G06F 1/00* (2006.01)

(52) U.S. Cl.
USPC ............................. 706/52; 717/104; 370/335

(58) Field of Classification Search
USPC .......................................................... 706/52
See application file for complete search history.

(56) References Cited

U.S. PATENT DOCUMENTS

2008/0249870 A1* 10/2008 Angell et al. .................. 705/14
2012/0290310 A1* 11/2012 Watson ............................. 705/2
2012/0315918 A1* 12/2012 Kadous ...................... 455/456.1

* cited by examiner

*Primary Examiner* — Alan Chen
*Assistant Examiner* — Kalpana Bharadwaj
(74) *Attorney, Agent, or Firm* — Banner & Witcoff, Ltd.; Michael A. Springs (57) ABSTRACT

Decision trees may be created and executed to manage calls in an interactive voice response (IVR) system. Users may be provided with one or more user interfaces to design, create, and modify decision trees. User may add and edit the rules, logic, and instructions of the decision tree, as well as additional information such as labels, headers, comments, and formatting. One or more decision tree files may be created including the rules, logic, and instructions of the decision tree, which are compatible with an execution engine. One or more decision tree development files also may be created including additional information to be used by a decision tree development application to provide the development environment.

17 Claims, 6 Drawing Sheets

```
119| acct-type =  "110"|127|407|
120| acct-type =  "115"|127|407|
121| acct-type =  "120"|127|407|
122| acct-type =  "125"|127|407|
123| acct-type =  "130"|127|407|
124| acct-type =  "135"|127|407|
125| acct-type =  "200"|127|407|
126| go to|137|407|
127| acct-type-debit = |"GOLD"|132|407|
128| acct-type-debit = |"PLAT"|132|407|
129| acct-type-debit = |"PLPR"|132|407|
130| acct-type-debit = |"PLMC"|132|407|
131| go to|137|407|
132| offer-state|set value|"kc2930"|407|407|
133| next-state|set value|"p12947"|407|407|
134| presented-offerid|set value|"45"|407|407|
135| end||407|407|
136| No Op|407|407|
137| cti-selected-offer =  ""|253|407|
138| cti-selected-offer =  "MSCSTOSMBEMBCDB"|220|407|
139| cti-selected-offer =  "MSCSTOSMBEMBBNCD"|224|407|
140| cti-selected-offer =  "MSCSTOSMBEMBCHK"|228|407|
141| cti-selected-offer =  "MSCSTOSBEMBFCAT"|232|407|
142| cti-selected-offer =  "MSCSTOSBEMOLB50"|236|407|
143| cti-selected-offer =  "MSCSTOSBEMBOLBS"|240|407|
144| cti-selected-offer =  "MSCSTOSBEMBUPSA"|244|407|
145| cti-selected-offer =  "MMSBPreAppr"|160|407|
146| cti-selected-offer =  "MSCSTOCONRISKA"|169|407|
147| cti-selected-offer =  "MSCSTOCONBSELL"|173|407|
148| cti-selected-offer =  "MSCSTOCONRISKB"|184|407|
149| cti-selected-offer =  "MSCSTOCONASELL"|188|407|
150| cti-selected-offer =  "CCSTOCCODCCIVR"|192|407|
151| cti-selected-offer =  "LOESTOHELOCDIVR"|196|407|
152| cti-selected-offer =  "MSCSTOKTCNODNOS"|200|407|
153| cti-selected-offer =  "MSCSTOKTCDCANOS"|204|407|
```

DECISION TREE CREATION AND EXECUTION IN AN INTERACTIVE VOICE RESPONSE SYSTEM

TECHNICAL FIELD

One or more aspects of the disclosure generally relate to computing devices, computing systems, and computer software. In particular, one or more aspects of the disclosure generally relate to computing devices, computing systems, and computer software that may be used by an organization, business, or other entity to receive and manage customer calls and other interactions in an interactive voice response (IVR) system.

BACKGROUND

Interactive voice response (IVR) systems are used to manage calls and other interactions from users to an organization or business, such as a financial institution. Customers may call a business for many different reasons. For example, when calling a financial institution, a customer may call to open a new account, retrieve an account balance, report a change of address, transfer funds, report a fraudulent charge, talk to a customer representative, or for other various reasons. An IVR system receives and manages the customer calls using decision trees. A decision tree includes a set of rules, logic, or instructions which receive and process inputs from calls or other interactions, and perform actions in response. For example, an IVR system may use a decision tree to route a call to an appropriate customer specialist based on the customer's responses to questions posed by the IVR. Decision trees also may be used to determine whether an offer for a particular product or service should be presented to the customer. For instance, after a customer enters an account number into the IVR system, the IVR may look up the customer's account to determine the account type and other account features, and a decision tree may use this information to determine if an offer should be presented to the customer during the call.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for creating and executing decision trees in an interactive voice response (IVR) system. In certain embodiments, a decision tree development application may be provided with one or more user interfaces to allow users to design, create, and modify decision trees. The decision tree development application may allow users to add and edit the rules, logic, and instructions of the decision tree, as well as additional information such as labels, headers, comments and other metadata. The decision tree development application may also support various formatting functionality within the user interfaces displaying the decision tree. After the creation or modification of the decision tree via the user interfaces, one or more decision tree files may be created corresponding to the decision tree. For example, the decision tree development application may generate one or more decision tree files corresponding to the rules, logic, and instructions of the decision tree, which are compatible with a decision tree execution engine of the IVR system. Additionally, one or more decision tree development files may be generated which may or may not be compatible with an execution engine, but which are compatible with the decision tree development application. For instance, a decision tree development file may include labels, headers, comments and other metadata, and formatting which might not be permitted within the decision tree files used by the execution engine.

Additional aspects of the disclosure relate to validating, testing, and/or debugging the decision tree files before the decision tree is executed by the execution engine of IVR system. As an example, the decision tree development application may use the rules and requirements of the execution engine to allow users to validate the decision tree instructions, and to test and debug the execution of the decision tree within the development environment before saving the decision tree for execution by the execution engine. According to further aspects, the IVR system may support versioning and user control. For example, a decision tree development application may automatically maintain and update a version number of decision tree files, along with associated user names or identifiers, when decision trees are edited. In additional aspects, a decision tree development application may be used to generate decision trees which are compatible with multiple different decision tree formats and multiple execution engine types.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1A:
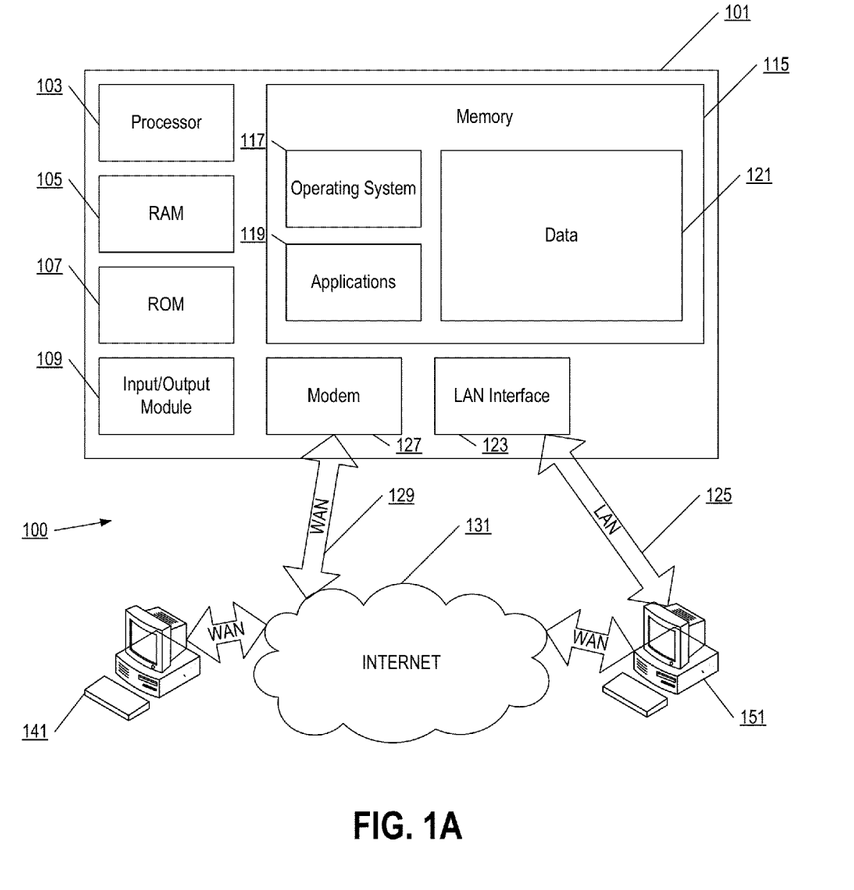
FIG. 1A illustrates an example operating environment in which various aspects of the disclosure may be implemented.

FIG. 1A illustrates an example block diagram of a generic computing device 101 (e.g., a computer server) in an example computing environment 100 that may be used in one or more illustrative embodiments of the disclosure. For example, the generic computing device 101 may correspond to a server in an interactive voice response (IVR) system, as described in examples below. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mobile device, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and the like) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
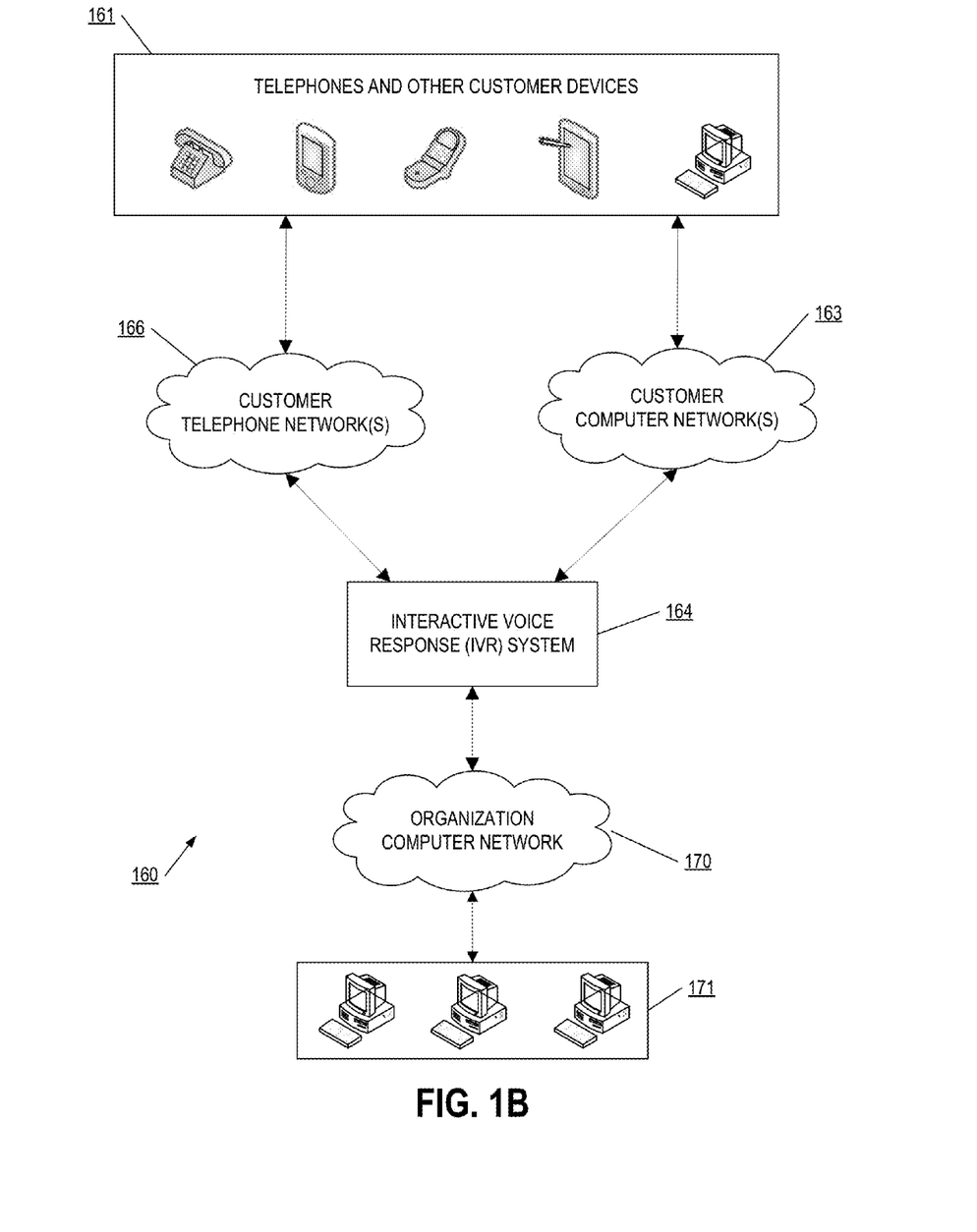
FIG. 1B illustrates another example operating environment in which various aspects of the disclosure may be implemented.

FIG. 1B illustrates another example operating environment in which various aspects of the disclosure may be implemented. As illustrated, system 160 may include one or more telephones and/or other customer communication devices 161 (e.g., cellular telephones, smartphones, personal digital assistants (PDAs), notebook computers, laptops, and personal computers). Communication devices 161 may, in some examples, be connected via one or more communications links to telephone networks 166 and/or computer networks 163. The telephone networks 166 and computer networks 163 may be connected via communication links to an interactive voice response (IVR) system 164. The IVR system 164 may include one or more computers, servers, processors, and/or databases for providing IVR functionality. For example, the IVR system may receive and automatically process telephone calls and other communications from users (e.g., customers), and direct the users to the appropriate resources based on voice or touch-tone telephone inputs received from the customers. Thus, one or more servers in the IVR system 164 may be used to receive or initiate customer telephone calls or other user interactions, process voice inputs or other inputs received from customers, and determine the appropriate set of actions to initiate for the customer.

As an example, the IVR system 160 may be associated with a business, such as a bank or other financial institution. In such examples, various elements may be located within the financial institution and/or may be located remotely from the financial institution. For instance, the telephones and other customer devices 161 may be located remotely from the financial institution and may be controlled by the user or customer. The customer devices 161 may be used, for example, by customers of the financial institution to conduct financial transactions via the telephone networks 166 and/or computer networks 163. In this example, the computer network 170 may be a secure computer network used by the organization (e.g., employees, managers, and administrators at the financial institution) to access the IVR system 164 via the organization's computers and systems 171.

Telephone networks 166 may be any suitable telephone network, including regular Public Switched Telephone Network (PSTN) or a Voice over Internet Protocol (VoIP) network. Computer networks 163 and 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same.

Figure 2:
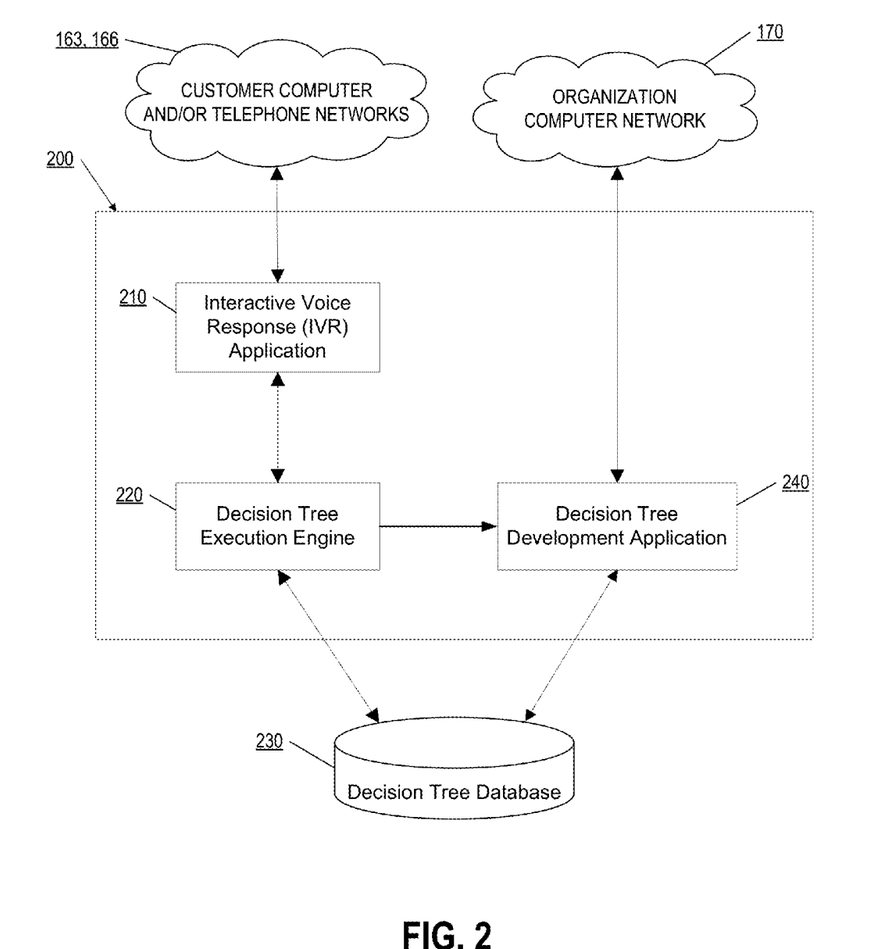
FIG. 2 illustrates an example interactive voice response (IVR) system according to one or more illustrative aspects described herein.

FIG. 2 illustrates an example interactive voice response (IVR) system 200 according to one or more aspects described herein. The IVR system 200 in this example may contain an interactive voice response (IVR) application 210 and a decision tree execution engine 220, which are configured to receive and response to customer interactions. The IVR application 210 and decision tree execution engine 220 may be any suitable software application or program for implementing the features described herein. The functionality of IVR application 210 and the decision tree execution engine 220 may be performed by a single software application or multiple software applications, and these components may be located on a single server or on separate servers configured to communicate with each other. The IVR application 210 and the decision tree execution engine 220 may communicate with each other in any suitable manner, for example, through inter-process communication provided by an operating system (e.g., when executing on the same server), or through a one or more communication links/computer networks (e.g., when executing on different servers).

In certain embodiments, the IVR application 210 may be configured to receive data from and send data to users/customers through computer networks 163 and telephone networks 166, whereas the decision tree execution engine 220 may be configured to retrieve and execute decision trees based on the user data received by the IVR application 210. A decision tree includes a set of rules, logic, or instructions for analyzing information relating to a user of the IVR system 200 and determining an action to take with respect to that user. For example, a decision tree may contain the logic to analyze customer information obtained during an automated call session, such as the customer's responses to questions during the session and/or retrieved customer account information, and to determine and initiate a course of action for that customer during the session. For instance, based on a first customer's responses (e.g., voice or touch-tone responses) during a call session, and based on the details of the first customer's account, a decision tree executed by the execution engine 220 may determine that the first customer should be offered a particular product or service during the call. However, during a call session with a second customer, the same decision tree executed by the execution engine 220 may determine, based on the second customer's responses and/or the second customer's account details, that the second customer should not be offered the product or service during the call. Other decision trees may be used to provide customers with requested information (e.g., account information, order status, account balances, and the like), or to route customers to specific departments or customer service representatives (e.g., sales, returns, bill payment, technical support, and the like). In other examples, decision trees need not only manage customer interactions via telephone. Rather, aspects described herein may be used for decision trees that manage other types of user/customer interactions (e.g., chat, instant messaging, email, and the like).

Decision trees may take the form of programming source code, scripts, data files, mark-up language (e.g., .xml files), or any other suitable format that may be recognized and processed by the execution engine 220. Further, different execution engines 220 may recognize different types of decision tree formats. Therefore, decision trees compatible with certain IVR systems 200 might not be compatible with other IVR systems, and vice versa. In certain embodiments, an IVR system 200 may include multiple execution engines 220 compatible with different formats of decision trees.

As shown in this example, the decision trees for an IVR system 200 may be stored in a decision tree database 230. The decision tree database 230 may reside on the same server as one or more of the IVR system components/applications, or may reside at a separate location. A decision tree database 230 may be shared by multiple IVR systems 200, and may store decision trees in various different formats to be compatible with different execution engines 220 and/or different IVR systems 200.

The IVR system 200 may also include a decision tree development application 240. As described in detail below, the decision tree development application 240 may be accessible to members of the organization providing the IVR system 200 (e.g., employees, managers, administrators, and the like) via the organization's computers 171 communicating with the IVR system 200 over the organization's computer network 170 (e.g., a corporate Intranet or other secure organization network). In certain examples, organization members may access the decision tree development application 240 over the same telephone and/or computer networks (e.g., 163, 166) that customers use when interacting with the IVR application 210.

The decision tree development application 240 may provide a development environment to allow users to create new decision trees or retrieve decision trees from the decision tree database 230, and to view, modify, and save the decision trees back to the database 230 for subsequent execution by the execution engine 220. In the development environment, one or more graphical user interfaces (GUIs) may be provided by the decision tree development application 240, to provide users (e.g., organization members) with functionality to design, create, and modify decision trees, as well as validate, test, and debug the decision trees prior to their execution by the execution engine 220. In certain embodiments, the decision tree development application 240 may receive data from the execution engine 220 describing the formats and requirements for decision tree files that are compatible with (i.e., recognizable and executable by) the execution engine 220, thereby enabling the decision tree development application 240 to save decision trees in a compatible format. The decision tree development application 240 also may be configured to save decision trees in multiple different formats, for example, different decision tree file types which may be compatible with different execution engines 220 and/or different IVR systems 200.

In certain embodiments, the decision tree development application 240 may create and store multiple files for each decision tree. For example, a first decision tree file may be created which is compatible with the execution engine 220 and contains all of the rules, logic, and/or instructions for the decision tree, while a second decision tree file may store additional information related to the decision tree. For instance, the second decision tree file may be a decision tree development file containing information such as labels, headers, and comments, as well as spacing, formatting, versioning, user tracking information, and other information which may be used by the decision tree development application 240 to provide a development environment for designing, creating, and modifying decision trees.

In this example, the execution engine 220 may be configured to retrieve, process, and execute the first decision tree file. Thus, it may be required that the first decision tree file is compatible with the execution engine 220, while the second decision tree file may or may not be compatible with the execution engine 220. For example, an execution engine 220 might not recognize certain types of information such as labels, headers, metadata, comments, and formatting. Thus, such information may be stored within the second decision tree file, and not within the first decision tree file which is executed by the execution engine 220. In other examples, the execution engine 220 may recognize such additional types of information, but the execution engine 220 may perform more efficiently when processing and/or executing decision trees that do not contain such additional information.

Further, in this example, the decision tree development application 240 may be configured to access only the second decision tree file, or to access both the first and the second decision tree files, to provide the development environment for designing, creating, and modifying decision trees. For instance, the decision tree development application 240 may open the first decision tree file (i.e., the decision tree file compatible with the execution engine 220) to retrieve the rules, logic, and/or instructions associated with the decision tree, and may open the second decision tree file (i.e., the decision tree development file) to retrieve additional information associated with the decision tree (e.g., labels, headers, comments, spacing, formatting, versioning, user tracking, and the like) that may be used to render the user interfaces in the development environment allowing users to create, view, and modify the decision tree. In other examples, a decision tree development file may contain both the rules, logic, and/or instructions for the decision tree, as well as the additional information used to provide the decision tree development environment. Thus, it may be required that the decision tree development files may be compatible with (i.e., capable of being opened for viewing and/or editing by) the decision tree development application 240, while the decision tree files which are compatible with the execution engine 220 may or may not be required to be compatible with the decision tree development application 240.

As discussed above, a decision tree development application 240 may create, modify, and/or store multiple different files corresponding to a decision tree. The multiple decision tree files may be stored in the same database or in different storage locations. For example, the decision tree files containing the decision tree rules, logic, and instructions, which are compatible with the execution engine 220 may be stored in the decision tree database 230 which is accessible to the execution engine 220. The decision tree development files containing the information used to provide the development environment (e.g., labels, headers, comments, metadata, and information relating to spacing, formatting, versioning, and user tracking for the decision tree) also may be stored in the decision tree database 230, or may be stored at a separate location accessible to the decision tree development application 240 but not necessarily accessible to the execution engine 220. For instance, decision tree development files not needed by the execution engine 220 may be stored in a separate database inside or outside of the IVR system 200. Such additional decision tree files also may be stored locally on the computer system 171 of the user (e.g., organization member) designing, creating, or modifying the decision tree via the decision tree development application 240.

In certain embodiments, users of the development environment provided by the decision tree development application 240 may have individual user settings and preferences that may be applied to all decision trees that the users view, create, modify, or update via the development application 240. For example, a user settings and preferences file may be stored on the user's local computer system 171 and the settings and preferences therein may be retrieved and applied each time the user creates or opens a decision tree via the development application 240. A user's individual settings and preferences may include the user's preferences regarding the functionality and layout of the development environment user interfaces. Thus, when a first user of the organization uses the decision tree development application 240 to open a decision tree, the development environment (e.g., user interface screens, functionality, and layout) provided to the user may be based on the users preferences, whereas a second user of the organization having different user preferences and settings would be provided a different development environment when opening the same decision tree. Similarly, a user's labels, headers, comments, formatting and other information relating a decision tree may be stored individually for that user, so that another user opening the same decision tree may be presented with different labels, headers, comments, formatting, and the like. User preferences, settings, and any other individual data, may be stored separately (e.g., in local files on the user's computer system 171) or together in a central storage location (e.g., database 203 or other storage on the IVR system 200), and may be updated via the decision tree development application 240.

Each user of the decision tree development application 240 also may have an associated user identifier to facilitate user tracking and versioning of decision trees, and to control user permissions to access decision trees. Different users within the organization may have different permissions (e.g., view, modify, copy, and delete permissions) with respect to different decision trees and/or versions of decision trees. In certain examples, the decision tree development application 240 may use a user identifier or other authentication credentials provided by the user via a user interface screen, or retrieved from a database or other storage, to determine the user's level of permissions for a decision tree. The decision tree development application 240 may then allow or deny access to the decision tree, or may enable or disable certain features in the decision tree development environment, based on the user's permissions.

Figure 3:
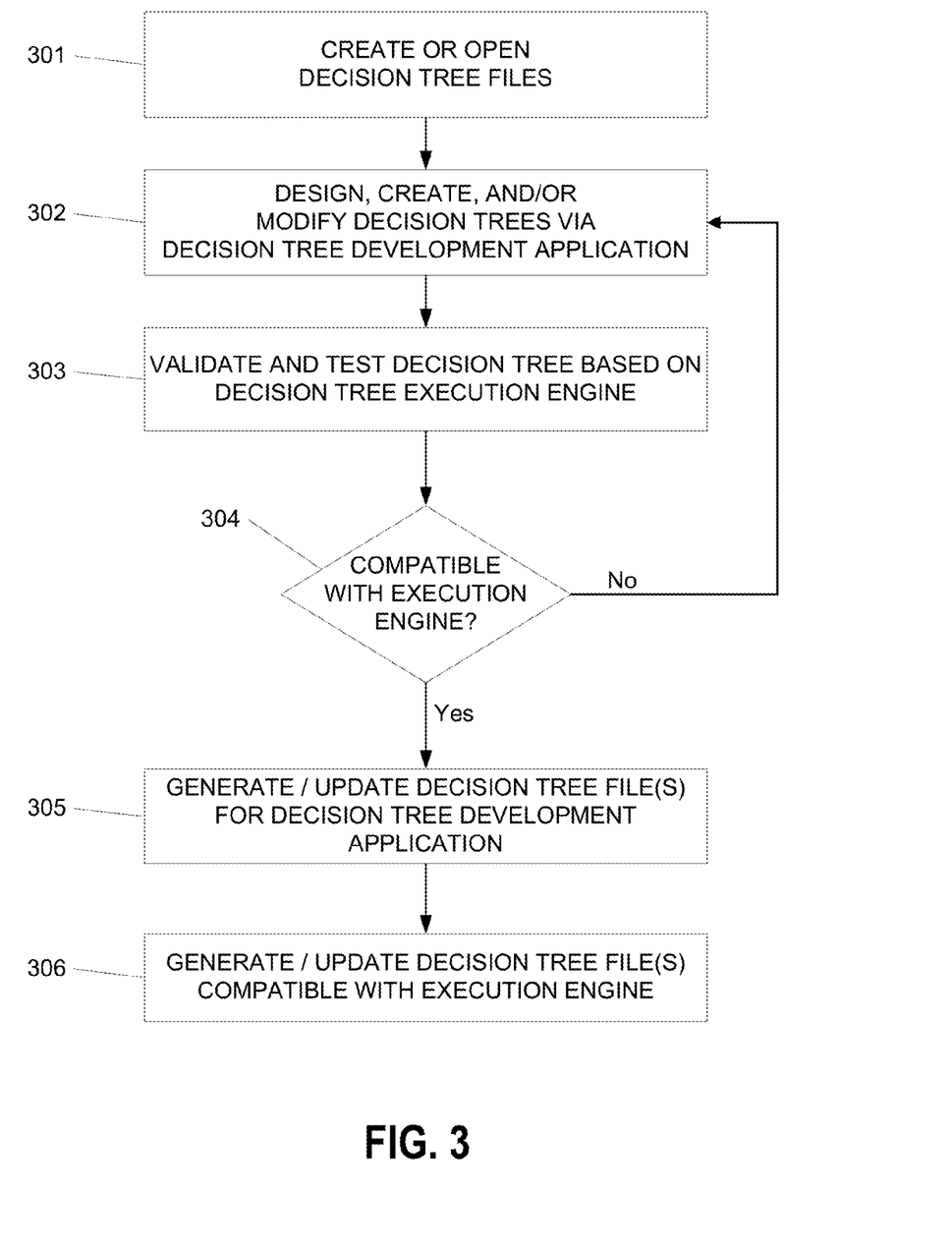
FIG. 3 illustrates an example method of generating one or more decision tree files for an interactive voice response (IVR) system according to one or more illustrative aspects described herein.

Referring now to FIG. 3, an example method is shown for designing, creating, and/or modifying decision trees in an interactive voice response (IVR) system. According to one or more aspects, the example methods described herein may be implemented by software executed on one or more computers, such as the generic computing device 101 of FIG. 1A, and/or within a computing system, such as system 160 of FIG. 1B. In some arrangements, the example methods described herein may be performed by and/or in combination with a server (e.g., IVR system 200). For instance, as discussed above, a decision tree development application 240 executing on the IVR system 200 may execute certain functions for generating one or more decision tree files. Additionally, the example methods described herein may be performed in combination with one or more computing devices or systems operating outside the IVR system 200 (e.g., organization computers 171). For example, the decision tree development application 240 may operate as a server application in communication with client applications on computing devices 171 (e.g., via a web server or other client-server configuration), thereby allowing employees or other authorized members of the organization to design, create, and modify decision trees remotely from computers 171 over the organization network 170.

In step 301, the IVR system 200 may open or create one or more decision tree files. To begin designing, creating, and/or modifying decision trees, a user (e.g., an employee, manager, or administrator at an organization) may access and initiate communication with the IVR system 200. For example, an employee of an organization may use an organization computer 171 to log onto the decision tree development application 240 of the IVR system 200 using a web browser or other client application. In other examples, users may be able to access the IVR system 200 to design, create, and modify decision trees from other computers and/or networks (e.g., computer network 163) outside of the organization network 170. In certain examples, users may be authenticated, by providing a user name and password or using other authentication techniques, to confirm that the user has permissions to access the IVR system 200, the decision tree development application 240, and the individual decision tree files stored by the IVR system 200. Thus, the IVR system 200 may allow certain users to view and/or modify some decision trees but may not allow other users. Additionally, certain users may be permitted to create new decision trees on the IVR system 200 and/or to save newly created decision trees for execution by the execution engine 220, while other users might not be permitted to create and/or store new decision trees.

As discussed above, the IVR system 200 may store multiple files for each decision tree, for example, one or more decision tree files compatible with the execution engine 220, and one or more decision tree development files storing additional types of information (e.g., labels, headers, comments, formatting, and the like) related to the development environment for the decision tree. Thus, in step 301, if the user selects an existing decision tree to be viewed or modified, then the decision tree development application 240 may identify and retrieve all decision tree files associated with the selected decision tree. Alternatively, if the user selects an option to create a new decision tree, then the decision tree development application 240 may create one or more new decision tree files corresponding to the new decision tree. For example, a first decision tree file compatible with the execution engine 220 may be created in (or retrieved from) the decision tree database 230, while a second decision tree development file with different information may be created in (or retrieved from) the database 230 or a different storage location on the IVR system 200 locally on the user's computer 171. Additionally, in step 301, the decision tree development application 240 may identify and/or open a user settings and preferences file (e.g., stored locally on the user's computer 171) containing one or more settings or preferences of the user for designing, creating, and modifying decision trees within the decision tree development application 240.

In step 302, the IVR system 200 may provide a development environment with one or more user interfaces that allow users to design, create, and/or modify decision trees. After retrieving or creating the decision tree files in step 301, the decision tree development application 240 may render the files in a development environment user interface in step 302. For example, the decision tree development application 240 may retrieve the rules, logic, and/or instructions for the decision tree from a first decision tree file compatible with the execution engine 220, may retrieve additional information (e.g., labels, headers, and the like) from one or more other decision tree files, and then may combine the information into a single development user interface that contains all the rules, logic, and instructions of the decision tree along with the integrated labels, headers, and formatting, and the like.

Figure 4A:
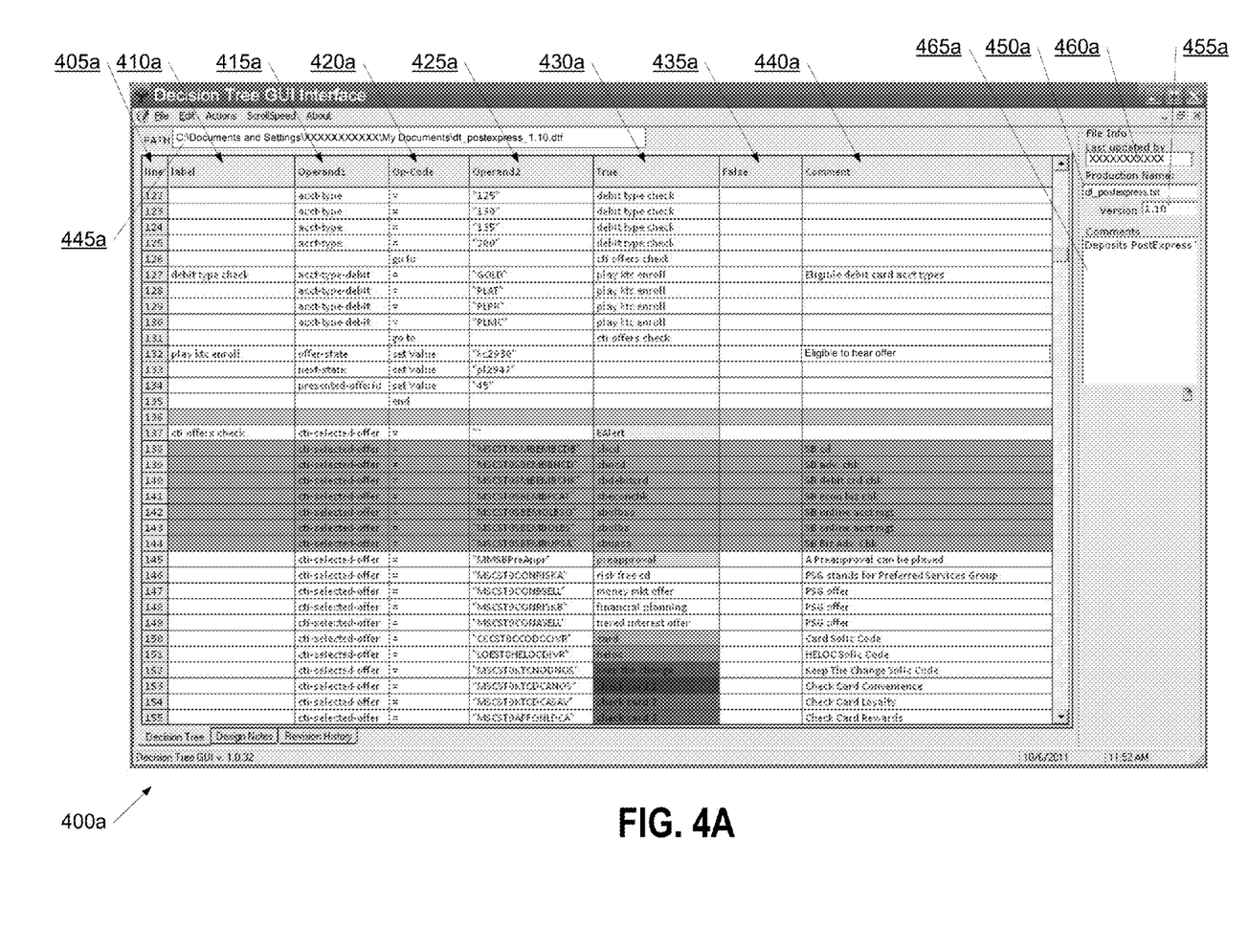
FIG. 4A illustrates an example user interface of a decision tree development application according to one or more illustrative aspects described herein.

Referring now to FIG. 4A, an example user interface screen is shown of a decision tree development application 240. The user interface shown in this example corresponds to a decision tree development file 400a named "dt_postexpress_1.10.dtf." In FIG. 4B, another example is shown of a decision tree file 400b which is compatible with a decision tree execution engine 220. In this example, the decision tree development file 400a (shown in FIG. 4A) and the decision tree file 400b compatible with the execution engine 220 (shown in FIG. 4B) may correspond to the same decision tree. The decision tree file 400b may contain all of the rules, logic, and instructions necessary to execute the decision tree, but may be designed to be compatible with an execution engine 220 that does not recognize or cannot process labels, headers, comments, or certain formatting. Thus, the decision tree file 400b does not contain any labels, comments, or metadata, and includes only basic text formatting as required by the execution engine 220. In contrast, the decision tree development file 400a may contain all of the same decision tree logic, rules, and instructions as the decision tree file 400b, as well as additional information such as labels associated with one or more instructions and/or line numbers (e.g., "debit type check" at line 127), comments within the decision tree instructions (e.g., "Eligible to hear offer" at line 132), user control and versioning information 455a and 460a, and additional formatting information (e.g., shaded lines 138-144, colored lines 150-155 in "True" column 430a).

Figure 4B:
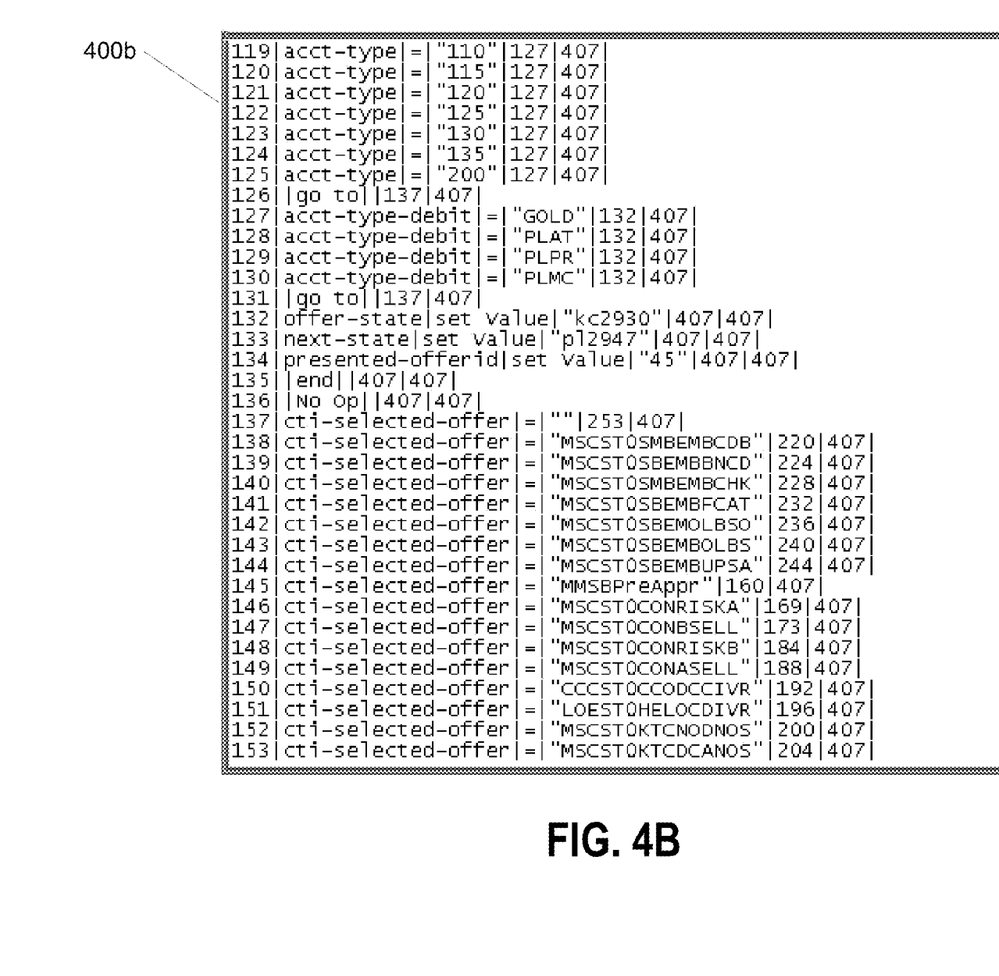
FIG. 4B illustrates an example of a decision tree file according to one or more illustrative aspects described herein.

In other examples, a decision tree development file 400a may contain the additional information (e.g., labels, comments, and formatting information) but might not contain the decision tree logic, rules, and instructions for the decision tree. For instance, a decision tree development file 400a may contain only line numbers (405a), labels (410a), and comments (440a), without necessarily containing the decision tree logic, rules, and instructions (415a-435a). Additionally, a decision tree development file 400a may include formatting information by identifying the type of formatting to be applied (e.g., highlighting, background color, font, and the like) and the data (e.g., line and/or column number) to apply the formatting. In this example, the decision tree development application 240 may access both the decision tree file 400b and the development file 400a, and use the line numbers or other indicators to combine the data from the two files, and then render a development environment user interface as shown in FIG. 4A.

In some examples, a decision tree development file 400a may contain links or pointers to associated decision tree files 400b, and/or to specific locations within decision tree files 400b. Thus, a user in the decision tree development application 240 might only need to identify the location of the decision tree development file 400a, and might need not to know or identify the location of the associated decision tree file 400b which is compatible with the execution engine 220. For example, an IVR system 200 may allow users to directly access decision tree development files 400a, but may restrict access to decision tree files which are compatible with execution engines 220 by storing those files in a secure decision tree database 230. A decision tree development application 240 also may access a separate storage which includes, for a given decision tree, the locations of one or more decision tree files 400b compatible with the execution engine(s) 220, and the locations of one or more separate decision tree development files 400a which include the additional information to be used by the decision tree development application 240 to provide the user with the development environment for the given decision tree.

As illustrated in the above examples, by using two or more separate files associated with the same decision tree, an IVR system 200 may provide users with additional and potentially more robust development environments via a decision tree development application 240 for designing, creating, and modifying decision trees, while also generating and maintaining decision tree files that are compatible with the execution engine(s) 220 of the IVR system 200. In certain examples, decision tree development files (e.g., 400a) may contain different types of data and different formatting, depending on the features supported by the decision tree development application 240. Further, the formatting, labels, comments, and other information in a single development file 400a may be applied to multiple decision tree files 400b which are compatible with the execution engine 220 (e.g., different versions of the same decision tree). Additionally, the decision tree files which are compatible with the execution engine 220 may differ in format and in content depending on the specifications and requirements of the execution engine 220. Different decision tree execution engines 220, in the same IVR system 200 or in different IVR systems 200, may support different features and may have different requirements for decision tree files 400b. Therefore, the decision tree development application 240 or other component within the IVR system 200 may be configured to generate multiple different decision tree files 400b compatible with the multiple different execution engines 200, or to convert decision trees compatible with a first execution engine 220 to execute on a second execution engine 220.

Returning to FIG. 3, in step 302 the user interacts with the development environment provided by the IVR system 200 to design, create, and/or modify decision trees. As discussed above, the decision tree development application 240 may allow users to develop decision trees without being limited to requirements and specifications of the execution engine 220. For example, in step 302 may add and edit labels, headers, comments, formatting, and other data which might not be recognized or permitted by the execution engine 220. The decision tree development application 240 also may provide a set of development environment features, for example, any of the features illustrated in the example user interface of FIG.

4A, and/or other well-known features of software development environments for computer programming languages. For example, the decision tree development application 240 may recognize labels and may create links between label references and their target locations to allow the user to quickly follow the execution sequence of decision tree instructions. As another example, the decision tree development application 240 may automatically update line numbers whenever the user adds or removes lines of instructions, labels, or other information. For instance, referring to the example user interface shown in FIG. 4A, if the user inserts a new instruction line after line number 130 with an option for a new type of debit account, the decision tree development application 240 may automatically increment the all line numbers after line 130.

In certain embodiments, the development environment provided in step 302 may be derived from one or more other software applications. For example, the decision tree development application 240 provided in step 302 may be a modified spreadsheet application or a modified database application.

In step 303, the IVR system 200 may validate and/or test decision trees that were created or modified by the user via the decision tree development application 240. For example, after receiving an indication that the user has finished creating or modifying a decision tree, the IVR system 200 may invoke a validation process to confirm that the new or updated decision tree is compatible with the execution engine 220. A testing process also may be performed, within the same or different process as the validation, to confirm that the decision tree may be executed successfully by the execution engine 220. The validation and/or testing may be performed by the decision tree development application 240 at the request of the user, in response to the user saving or closing a decision tree development file, or in response to the user ending a decision tree development application session. In some examples, the IVR system 200 may require a successful validation and/or testing before a new or updated decision tree is saved in the decision tree database 230. In other examples, the validation and testing of decision trees may be optionally performed or not performed at the discretion of the user.

The decision tree development application 240 or other component within the IVR system 200 may use format and content requirements of the execution engine 220 to perform the validation of new or updated decision trees. An execution engine 220 may require decision tree files to comply with specific rules regarding the number, type, and value of the instructions and instruction parameters. For example, an execution engine 220 may require comparison instructions to include exactly one operator, two operands, and at least one of a "True" action and a "False" action to perform based on the results of the comparison. The execution engine 220 may allow certain operator types (e.g., "=", ">", "<"), but might not allow other operator types (e.g., ">=" and "LIKE"). The execution engine 220 also may have specific requirements for data types (e.g., Boolean, string text, integers, floating point values, and the like) that may be used with as certain operands or parameters. Additionally, assignment and transfer instructions may be required to use certain keywords (e.g., "set Value" and "goto") and include certain numbers of parameters. The validation process performed in step 303 may parse and examine the decision tree instructions provided by the user via the decision tree development application 240 to confirm that the instructions comply with the content and formatting requirements of the execution engine 220.

In addition to the validation process described above, a decision tree may be tested and/or debugged to confirm that the execution of the decision tree by the execution engine 220 may be performed without certain execution errors. For example, after the user creates or modifies a decision tree via the decision tree development application 240, the development application 240 may perform one or more test executions of the decision tree instructions to confirm that there are no execution errors such as broken reference links (e.g., non-existing label names in "goto" instructions), infinite loops, access violations, deadlock, overflows, or other detectable execution errors. In certain examples, the decision tree development application 240 may provide a debugging feature which allows users to set and monitor variables while stepping through the execution of a decision tree one instruction at a time.

The validating, testing, and/or debugging of decision trees in step 302 may be performed by the decision tree development application 240 or other components within the IVR system 200. In certain examples, the decision tree development application 240 may request and receive updated validation information from the execution engine 220, such as a set of decision tree rules or a decision tree template, to allow the development application 240 to validate the decision trees according to the current requirements of the execution engine 220. Additionally, the decision tree development application 240 may access resources of the execution engine 220 to perform some or all of the testing and debugging processes. For example, the decision tree development application 240 may invoke an interface of the execution engine 220 to perform a controlled execution of the current decision tree, without the execution affecting any customers, setting any IVR system variables, and without the user needing to save the current decision tree to the decision tree database 230.

As noted above, a decision tree development application 240 may be associated with multiple different execution engines 220. For example, an IVR system 200 may include multiple execution engines 220 which have different requirements for decision trees. A decision tree development application 240 also may be associated with multiple different IVR systems 200. In certain examples, a decision tree development application 240 may be stored and executed locally on a user's computer (e.g., organization computer 171), rather than on the IVR system 200. In such examples, a user may design, create, and modify decision trees for multiple different IVR systems 200 and/or multiple different execution engines 220. In other examples, a development application 240 may execute on and/or may be limited to a specific IVR system 200 and/or the execution engines 220 on that IVR system 200.

For embodiments in which the decision tree development application 240 is associated with multiple different execution engines 220, the validating, testing, and debugging in step 303 may depend on the execution engine 220 that will be responsible for executing the decision tree after it is finalized and saved. Therefore, when a user is creating or modifying a decision tree and multiple execution engines 220 are available, the decision tree development application 240 may prompt the user to select which of the available execution engines 220 will be used to execute the new decision tree. The user may be prompted at the beginning of the session or when saving the decision tree. After receiving the selection of an execution engine 220 by the user, the decision tree development application 240 may request and receive any required information (e.g., rules for decision tree validation, a decision tree template, interfaces for testing and debugging, and the like) from the selected execution engine 220. In another example, if the user is modifying an existing decision tree, the development application 240 may automatically determine the associated execution engine 220 based on the storage location of the decision tree files, or based on information within the files themselves.

In step 304, if it is determined during the validation, testing, and/or debugging processes that a decision tree is not compatible with the execution engine 220 (304: No), then the IVR system 200 may prevent the decision tree from being saved and/or executed. In such examples, the development application 240 may return the user to step 302 to continue developing and further testing of the decision tree until it passes the required validation and testing. However, as noted above, the validation and testing of step 303 may be optional in certain embodiments. Thus, the determination in step 304 also may be optional. In some examples, users (e.g., system administrators or other authorized users) may override determinations that a decision tree is not compatible with the execution engine 220 and may proceed to step 305 despite failing a validation or testing process. In other examples, if a decision tree a fails a validation or test process (304: No), then the decision tree development application 240 may change the destination at which storage the decision tree files will be stored in steps 305 and 306. For example, an IVR system 200 may require that decision trees must be validated and tested before they are stored in the decision tree database 230, but may allow users to locally store (e.g., on computers 171) decision trees which are under development and have not yet been successfully validated or tested in steps 303-304.

If the required validation, testing, and/or debugging in step 303 are successful, and the decision tree development application 240 determines that the current decision tree is compatible with the execution engine 220 (304: Yes), then the IVR system 200 may generate and store one or more decision tree files in steps 305-306. As discussed above, the IVR system 200 may designate one or more central storage locations (e.g., decision tree database 230) for storing decision tree files that will be accessed by the execution engine 220. When creating a new decision tree with the decision tree development application 240, the new decision tree files may be created at a designated location within the decision tree database 230 so that they can be accessed and executed by the execution engine 220. When a decision tree is modified via the decision tree development application 240, the existing decision tree files may be overwritten with the updated decision tree files. Therefore, the IVR application 210 and the execution engine 220 potentially may execute continuously without needing to stop or restart while new decision trees are made available or existing decision trees are modified. Further, the functionality of the decision trees in managing and responding to user interactions (e.g., customer calls) may be changed without needing to compile (or recompile) the IVR application 210, the execution engine 220, or the decision tree files generated (or updated) and saved in steps 305-306.

In step 305, one or more decision tree development files are generated for a new decision tree, or updated for an existing decision tree. As discussed above, decision tree development files may contain information which is used by the decision tree development application 240 to provide a development environment to allow users to design, create, and modify decision trees. An example of a decision tree development file 400*a*, entitled "dt_postexpress_1.10.dtf," is shown in FIG. 4A. As shown in this example, decision tree development files may contain labels, headers, comments, and other metadata, as well as formatting information to be used by the decision tree development application 240. As in this example, decision tree development files 400*a* may also (but need not necessarily) contain the rules, logic, and instructions of the decision tree. In other examples, the rules, logic, and instructions of the decision tree may be stored in other files (e.g., 400*b*), and the decision tree development file might contain only the labels, headers, comments, and other metadata, along with the necessary formatting information, to allow the decision tree development application 240 to render the decision tree, using the instructions stored in the other decision tree files, in the development environment.

In step 306, one or more decision tree files are generated for a new decision tree, or updated for an existing decision tree, which contain the rules, logic, and instructions of the decision tree, and which are compatible with the execution engine 220. As an example, the decision tree development application 240 may generate a decision tree file by transforming the decision tree development file 400*a* shown in FIG. 4A, into a decision tree file 400*b* shown in FIG. 4B, which is compatible with the execution engine 220.

As discussed above, the execution engine 220 may require a specific type of format or the decision tree instructions, and might not recognize various types of additional information such as labels, headers, metadata, comments, and other types of information which are not necessary for the execution of the decision tree. Accordingly, to create a decision tree file in step 306 which is compatible with the execution engine 220, the decision tree development application 240 may remove any labels, comments, formatting, and other data from the decision tree shown in the development user interface of the development application 240. The decision tree development application 240 may add, remove, or replace various formatting, such as adding the "|" separator character to separate instruction parameters in the example decision tree file 400*b* shown in FIG. 4B. When removing labels, the development application 240 also may determine the line number that corresponds to the label and may replace the label name with the line number in the decision tree file 400*b* compatible with the execution engine 220. As when validating, testing, and debugging the decision tree, the development application 240 may communicate with the execution engine 220 when creating or modifying a decision tree file in step 306. For example, the execution engine 220 may provide the updated rules and requirements for compatible decision tree files, thus allowing the development application 240 to generate decision tree files in accordance with those requirements.

In certain embodiments, when validating and testing the decision tree in step 303, or when creating and updating the decision tree files in steps 305 and 306, the decision tree development application 240 may be configured to analyze the decision tree rules, logic, and instructions, and to create headers for the decision tree. One type of decision tree header may identify a set of variables that potentially may be changed during the execution of the decision tree. For instance, if a first variable maintained by the IVR system 200 (e.g., a global or persistent variable) is not referenced at all in a decision tree, then the decision tree development application 240 may conclude that the first variable will not be modified by executing the decision tree and would not create a header for the first variable. However, if a second variable of the IVR system 200 is found within a decision tree and/or if an analysis shows that the value of the second variable may be modified by the decision tree, then the development application 240 may determine that the second variable should be identified in a decision tree header. Decision tree headers may be stored as headers within one or both of the decision tree files created in steps 305 and 306, and/or may be stored at another location within the IVR system 200. In certain embodiments, the execution engine 220 may use the header information before or during execution of a decision tree, for example, to identify which variables to access and lock and to determine an amount of memory to allocate for execution.

Referring again to FIG. 4A, the user interface 400a in this example allows the user to review and update certain file information for the corresponding decision tree development file. In this example, the path text box 445a allows the user to view the storage location of the current decision tree development file on the user's computer 171, or within the decision tree database 230. The user may rename the current decision tree development file using the production name text box 450a, and/or may change the decision tree version using the version text box 455a. The last updated by text box 460a may indicate the name (e.g., login, or other user identifier) of the user that is editing, or most recently edited, the decision tree currently displayed in the user interface. The comments box 465a may allow users to add and save comments for the currently displayed decision tree, such as a general description of the functionality of the decision tree, or a list of expected inputs and outputs for the decision tree.

In certain embodiments, the decision tree development application 240 may automatically maintain and update the version number. In such examples, the version number may be displayed in the user interface 400a, in an editable or non-editable text box 455a. Alternatively, the version number might not be transparent to the user but may be stored internally by the IVR system 200. For instance, the decision tree development application 240 may automatically increment the version number each time a decision tree development file is edited. Similarly, each time a new decision tree file 400b compatible with the execution engine 220 is generated or updated, the development application 240 may update an internally stored version number. In IVR systems 200 which support versioning, additional information may be stored along with version numbers, such as timestamps and user names or identifiers associated with each version. Additionally, the IVR system 200 may store previous versions of decision tree files, for example, within the decision tree database 230 or other storage location, so that the previous versions are available for later retrieval and re-execution within the IVR system 200 if desired.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. An apparatus, comprising:
at least one processor; and
memory storing computer-readable instructions that, when executed by the at least one processor, cause the apparatus to:
receive, via a user interface of a decision tree development application, one or more user inputs corresponding to a first decision tree for an interactive voice response system;
generate a first decision tree file associated with the first decision tree, wherein the first decision tree file has a file format that is compatible with a decision tree execution engine of the interactive voice response system; and
generate a second decision tree file associated with the first decision tree, wherein the second decision tree file has a file format that is not compatible with the decision tree execution engine of the interactive voice response system but is compatible with the decision tree development application, wherein generating the second decision tree file comprises:
incrementing a version number associated with the first decision tree; and
storing the incremented version number in the second decision tree file.

2. The apparatus of claim 1, wherein the one or more inputs received via the user interface of the decision tree development application includes a first label associated with a conditional statement, the first label identifying a portion of the first decision tree to be executed when the conditional statement is satisfied.

3. The apparatus of claim 2, wherein the second decision tree file comprises the first label, and wherein the first decision tree file does not comprise the first label.

4. The apparatus of claim 1, wherein generating the first decision tree file comprises:
identifying one or more labels received via the decision tree user interface;
for each of the one or more identified labels, determining an associated line number within the first decision tree; and
replacing each of the one or more identified labels with its associated line number in the first decision tree file.

5. The apparatus of claim 1, wherein generating the second decision tree file comprises:
identifying a first user associated with the one or more inputs received via the user interface of the decision tree development application; and
storing a user identifier corresponding to the first user in the second decision tree file.

6. The apparatus of claim 1, the memory storing further computer-readable instructions that, when executed by the at least one processor, cause the apparatus to:
analyze the first decision tree;
identify one or more variables potentially affected by an execution of the first decision tree; and
generate header information in the first decision tree file identifying the one or more variables potentially affected by an execution of the first decision tree.

7. The apparatus of claim 1, the memory storing further computer-readable instructions that, when executed by the at least one processor, cause the apparatus to:

determine that the first decision tree file does not comply with one or more execution rules of the decision tree execution engine; and initiate an error message via the decision tree development application in response to said determination.

8. A method, comprising:

receiving, via a user interface of a decision tree development application, one or more user inputs corresponding to a first decision tree for an interactive voice response system;

generating a first decision tree file associated with the first decision tree, wherein the first decision tree file has a file format that is compatible with a decision tree execution engine of the interactive voice response system, wherein generating the first decision tree file comprises:

identifying one or more labels received via the decision tree user interface;

for each of the one or more identified labels, determining an associated line number within the first decision tree; and replacing each of the one or more identified labels with its associated line number in the first decision tree file; and generating a second decision tree file associated with the first decision tree, wherein the second decision tree file has a file format that is not compatible with the decision tree execution engine of the interactive voice response system but is compatible with the decision tree development application.

9. The method of claim 8, wherein the one or more inputs received via the user interface of the decision tree development application includes a first label associated with a conditional statement, the first label identifying a portion of the first decision tree to be executed when the conditional statement is satisfied.

10. The method of claim 9, wherein the second decision tree file comprises the first label, and wherein the first decision tree file does not comprise the first label.

11. The method of claim 8, further comprising:

analyzing the first decision tree;

identifying one or more variables potentially affected by an execution of the first decision tree; and generating header information in the first decision tree file identifying the one or more variables potentially affected by an execution of the first decision tree.

12. The method of claim 8, further comprising:

determining that the first decision tree file does not comply with one or more execution rules of the decision tree execution engine; and initiating an error message via the decision tree development application in response to said determination.

13. One or more non-transitory computer-readable media having computer-executable instructions stored thereon that, when executed, cause at least one computing device to:

receive, via a user interface of a decision tree development application, one or more user inputs corresponding to a first decision tree for an interactive voice response system;

generate a first decision tree file associated with the first decision tree, wherein the first decision tree file has a file format that is compatible with a decision tree execution engine of the interactive voice response system, wherein generating the first decision tree file comprises:

identifying one or more labels received via the decision tree user interface;

for each of the one or more identified labels, determining an associated line number within the first decision tree; and replacing each of the one or more identified labels with its associated line number in the first decision tree file; and generate a second decision tree file associated with the first decision tree, wherein the second decision tree file has a file format that is not compatible with the decision tree execution engine of the interactive voice response system but is compatible with the decision tree development application.

14. The one or more computer-readable media of claim 13, wherein the one or more inputs received via the user interface of the decision tree development application includes a first label associated with a conditional statement, the first label identifying a portion of the first decision tree to be executed when the conditional statement is satisfied.

15. The one or more computer-readable media of claim 14, wherein the second decision tree file comprises the first label, and wherein the first decision tree file does not comprise the first label.

16. The one or more computer-readable media of claim 13, having further computer-executable instructions stored thereon that, when executed, cause the at least one computing device to:

analyze the first decision tree;

identify one or more variables potentially affected by an execution of the first decision tree; and generate header information in the first decision tree file identifying the one or more variables potentially affected by an execution of the first decision tree.

17. The one or more computer-readable media of claim 13, having further computer-executable instructions stored thereon that, when executed, cause the at least one computing device to:

determine that the first decision tree file does not comply with one or more execution rules of the decision tree execution engine; and initiate an error message via the decision tree development application in response to said determination.

* * * * *